US011203986B1

(12) United States Patent
Leach et al.

(10) Patent No.: US 11,203,986 B1
(45) Date of Patent: Dec. 21, 2021

(54) SYSTEMS AND METHODS FOR EXTENDED EMISSIONS COMPLIANT OPERATION OF A GAS TURBINE ENGINE

(71) Applicant: General Electric Company, Schenectady, NY (US)

(72) Inventors: David Leach, Simpsonville, SC (US); Valerie Suzanne Vernet, Inman, SC (US); Jason Nathaniel Cook, Greenville, SC (US); Jayaprakash Natarajan, Greer, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 67 days.

(21) Appl. No.: 16/895,619

(22) Filed: Jun. 8, 2020

(51) Int. Cl.
*F02C 9/54* (2006.01)
*F23R 3/34* (2006.01)
*F02C 3/20* (2006.01)
*F02C 9/28* (2006.01)
*F02C 9/26* (2006.01)

(52) U.S. Cl.
CPC .............. *F02C 9/54* (2013.01); *F02C 3/20* (2013.01); *F02C 9/263* (2013.01); *F02C 9/28* (2013.01); *F23R 3/34* (2013.01)

(58) Field of Classification Search
CPC .... F02C 3/20; F02C 9/263; F02C 9/28; F02C 9/54; F23R 3/34
See application file for complete search history.

(56) References Cited

U.S. PATENT DOCUMENTS

| | | | |
|---|---|---|---|
| 6,920,759 B2 | 7/2005 | Wakama et al. | |
| 7,620,461 B2 | 11/2009 | Frederick, II et al. | |
| 7,742,904 B2 | 6/2010 | Healy et al. | |
| 8,065,022 B2 | 11/2011 | Minto et al. | |
| 8,099,181 B2 | 1/2012 | Sterzing et al. | |
| 8,423,161 B2 | 4/2013 | Wilkes et al. | |
| 8,447,564 B2 | 5/2013 | Gross et al. | |
| 8,452,515 B2 | 5/2013 | Drohan et al. | |
| 8,499,541 B2 * | 8/2013 | Kawai | F23N 5/184 60/39.281 |
| 9,494,086 B2 | 11/2016 | Pandey et al. | |
| 9,790,834 B2 | 10/2017 | Miller et al. | |
| 9,791,351 B2 | 10/2017 | Miller et al. | |
| 9,909,508 B2 | 3/2018 | Jaiven et al. | |
| 11,092,085 B2 * | 8/2021 | Gassner | F02C 3/14 |

(Continued)

*Primary Examiner* — William H Rodriguez
(74) *Attorney, Agent, or Firm* — Armstrong Teasdale LLP

(57) ABSTRACT

A method of operating a rotary machine below a minimum emissions compliance load in a response mode includes reducing a fuel split to zero. The fuel split apportions a total flow of fuel to the combustor between a first combustion zone and a second combustion zone. The method also includes determining a current operating temperature of the first combustion zone using a digital simulation of the rotary machine. The method further includes determining a target operating temperature of the first combustion zone. The target operating temperature enables the rotary machine to operate below a traditional Minimum Emissions Compliance Load (MECL) while still in compliance with emissions standards. The method also includes channeling a first flow of fuel to the first combustion zone. The first flow of fuel decreases the temperature of the first combustion zone to the target operating temperature.

20 Claims, 6 Drawing Sheets

(56) References Cited

U.S. PATENT DOCUMENTS

| | | | | |
|---|---|---|---|---|
| 2012/0017601 A1* | 1/2012 | Eroglu | ............... | F02C 6/003 |
| | | | | 60/776 |
| 2014/0257666 A1* | 9/2014 | Abrol | ............... | F02C 9/48 |
| | | | | 701/100 |
| 2016/0222820 A1* | 8/2016 | Truesdale | ............... | F01D 25/002 |
| 2016/0333731 A1* | 11/2016 | Zhang | ............... | F02C 9/28 |
| 2017/0051681 A1* | 2/2017 | Arias Chao | ............... | F01K 13/02 |
| 2017/0058784 A1* | 3/2017 | Vandale | ............... | F02C 9/18 |
| 2018/0266333 A1* | 9/2018 | Gassner | ............... | F02C 3/14 |
| 2018/0283288 A1* | 10/2018 | Ishii | ............... | F02C 3/04 |
| 2019/0234315 A1* | 8/2019 | Price | ............... | F02C 9/26 |
| 2021/0148291 A1* | 5/2021 | Yamamoto | ............... | F02C 9/46 |

\* cited by examiner

SYSTEMS AND METHODS FOR EXTENDED EMISSIONS COMPLIANT OPERATION OF A GAS TURBINE ENGINE

BACKGROUND

The field of the disclosure relates generally to control of gas turbine engines and, more specifically, to controlling an extended emissions compliance load of a gas turbine engine.

In at least some known rotary machines, energy extracted from a gas stream in a turbine is used to power a mechanical load. Specifically, the rotary machine includes a compressor section, a combustor section, and a turbine section arranged in a serial flow arrangement. The compressor section compresses air for combustion with fuel within the combustor section, and the turbine section extracts energy from the combustion gases generated in the combustion section. At least some known combustion sections include Axial Fuel Staging (AFS) technology including axial (sequential) staging of combustion in at least two zones. More specifically, the combustion section may include a plurality of first stage fuel nozzles positioned upstream of a plurality of second stage fuel nozzles. A first flow of fuel is channeled into the combustor by the first stage fuel nozzles, and a second flow of fuel is channeled into the combustor by the second stage fuel nozzles. The intra-combustor temperature of the combustion gases generated by the combustion of the first flow of fuel is the $T_{3.5}$ temperature. Controlling the $T_{3.5}$ temperature and the air from the compressor section enables an operator to control the emissions generated by the rotary machine. More specifically, carbon monoxide emissions generated by the rotary machine are typically controlled through control of the T3.5 temperature.

Additionally, rotary machines typically have a Minimum Emissions Compliance Load (MECL) that is the lowest load on the rotary machine in which the rotary machine can operate while still in compliance with emissions standards. More specifically, traditional MECL is the lowest load on the rotary machine in which the combustor temperature facilitates maintaining compliance with emissions standards. When grid operators request that the operator of the rotary machine reduce operation of the rotary machine such that the rotary machine is operating below the MECL, the operator of the rotary machine turns off the rotary machine to maintain compliance with emission standards. As such, a rotary machine with a high MECL will result in the rotary machine ceasing operations more often than a rotary machine with a lower MECL, resulting in lost revenue for the operator of the high MECL rotary machine.

BRIEF DESCRIPTION

In one aspect, a method of operating a rotary machine below a minimum emissions compliance load in a response mode is provided. The rotary machine includes a combustor including a first combustion zone and a second combustion zone. The method includes i) reducing a fuel split to zero. The fuel split apportions a total flow of fuel to the combustor between the first combustion zone and the second combustion zone. The method also includes ii) determining a current operating temperature of the first combustion zone using a digital simulation of the rotary machine. The method further includes iii) determining a target operating temperature of the first combustion zone. The target operating temperature enables the rotary machine to operate below a traditional Minimum Emissions Compliance Load (MECL) while still in compliance with emissions standards. The method also includes iv) channeling a first flow of fuel to the first combustion zone. The first flow of fuel decreases the temperature of the first combustion zone to the target operating temperature. The method further includes v) iterating steps i through iv until the rotary machine is operating below the traditional MECL and complying with emission standards.

In another aspect, a method of operating a rotary machine below a minimum emissions compliance load in a standby mode is provided. The rotary machine includes a combustor including a first combustion zone and a second combustion zone. The method includes i) reducing a fuel split to zero. The fuel split apportions a total flow of fuel to the combustor between the first combustion zone and the second combustion zone. The method also includes ii) determining a current operating temperature of the first combustion zone using a digital simulation of the rotary machine. The method further includes iii) determining a target operating temperature of the first combustion zone. The target operating temperature enables the rotary machine to operate below a traditional Minimum Emissions Compliance Load (MECL) while still in compliance with emissions standards. The method also includes iii) determining a target operating temperature of the first combustion zone. The target operating temperature enables the rotary machine to operate below a traditional Minimum Emissions Compliance Load (MECL) while still in compliance with emissions standards. The method further includes iv) channeling a first flow of fuel to the first combustion zone. The first flow of fuel decreases the temperature of the first combustion zone to the target operating temperature and decreases a temperature of exhaust gases from the rotary machine below a minimum exhaust temperature for operation of a power plant. The method also includes v) iterating steps i through iv until the rotary machine is operating below the traditional MECL and complying with emission standards.

In yet another aspect, a rotary machine is provided. The rotary machine includes a compressor configured to compress a flow of inlet air, a combustor, and a computing device. The combustor includes a first combustion zone, a second combustion zone, at least one first fuel nozzle, and at least one second fuel nozzle. The at least one first fuel nozzle is configured to channel a first flow of fuel to the first combustion zone, and the at least one second fuel nozzle is configured to channel a second flow of fuel to the second combustion zone. The combustor is configured to receive the flow of inlet air. A fuel split is a fraction of a total flow of fuel that is channeled to the second combustion zone. The computing device includes a digital simulation of the rotary machine and is configured to operate the rotary machine in a response mode. The computing device is configured to reduce the fuel split to zero and determine a current operating temperature of the first combustion zone using the digital simulation of the rotary machine. The computing device is also configured to determine a target operating temperature of the first combustion zone. The target operating temperature enables the rotary machine to operate below a traditional Minimum Emissions Compliance Load (MECL) while still in compliance with emissions standards. The computing device is further configured to channel a first flow of fuel to the first combustion zone. The first flow of fuel decreases the temperature of the first combustion zone to the target operating temperature. The computing device is also configured to iterate until the rotary machine is operating below the traditional MECL and complying with emission standards.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
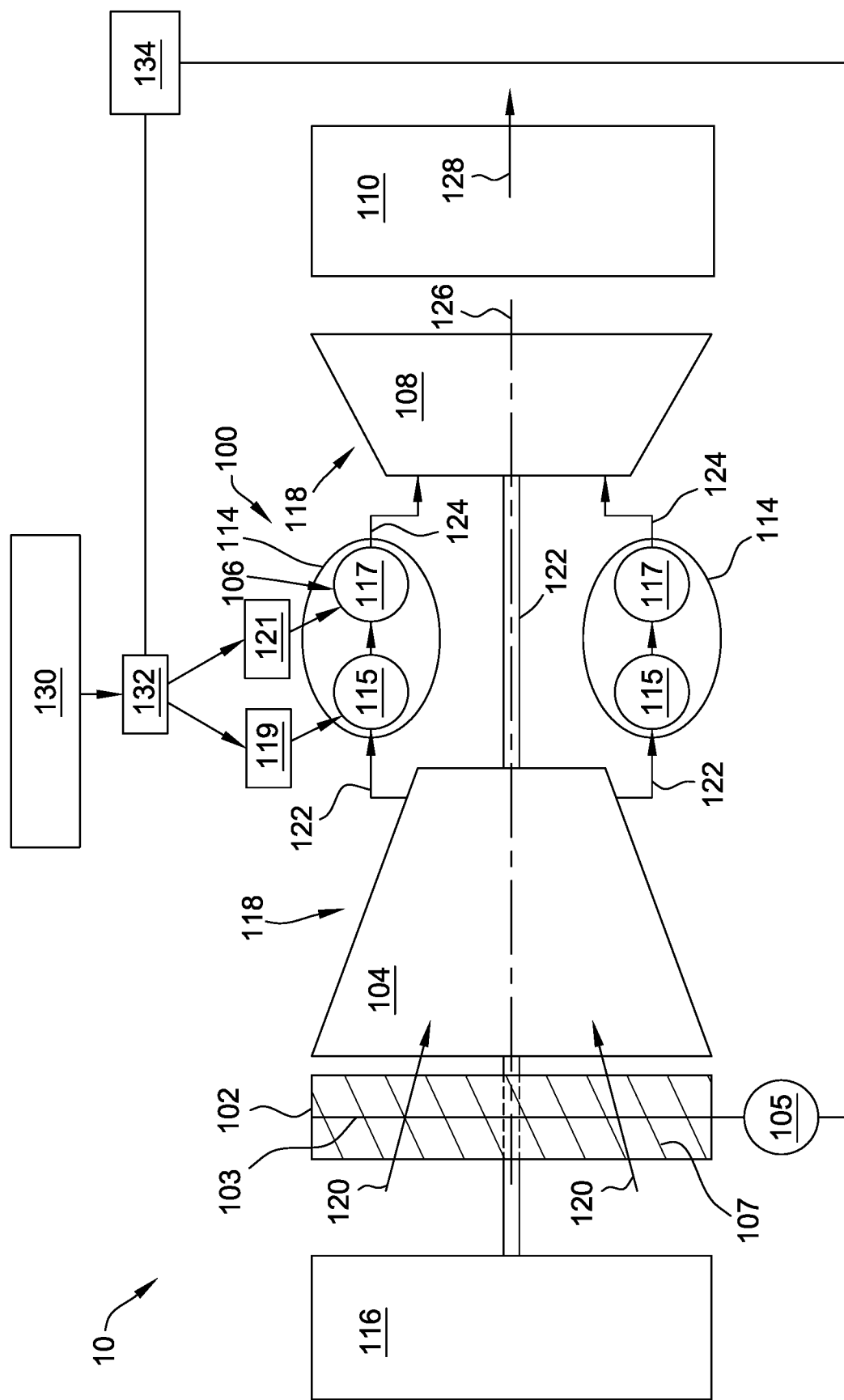
FIG. 1 is a schematic view of an exemplary rotary machine.
Figure 2A:
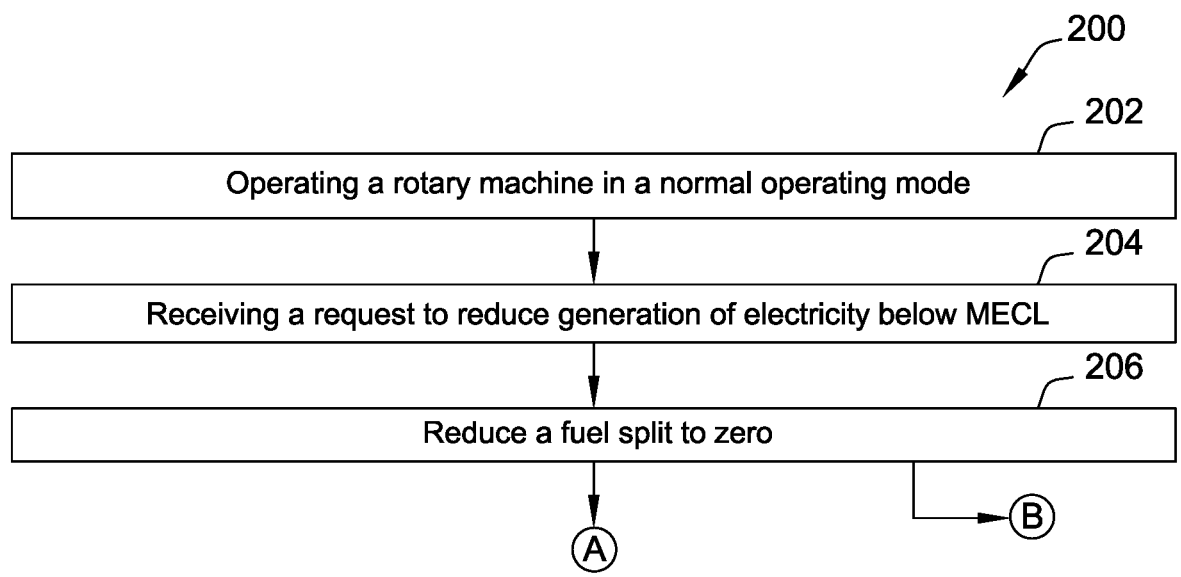
FIG. 2A is a flow diagram of an exemplary method of emissions compliant operation of rotary machine shown in FIG. 1 below a traditional MECL.
Figure 2B:
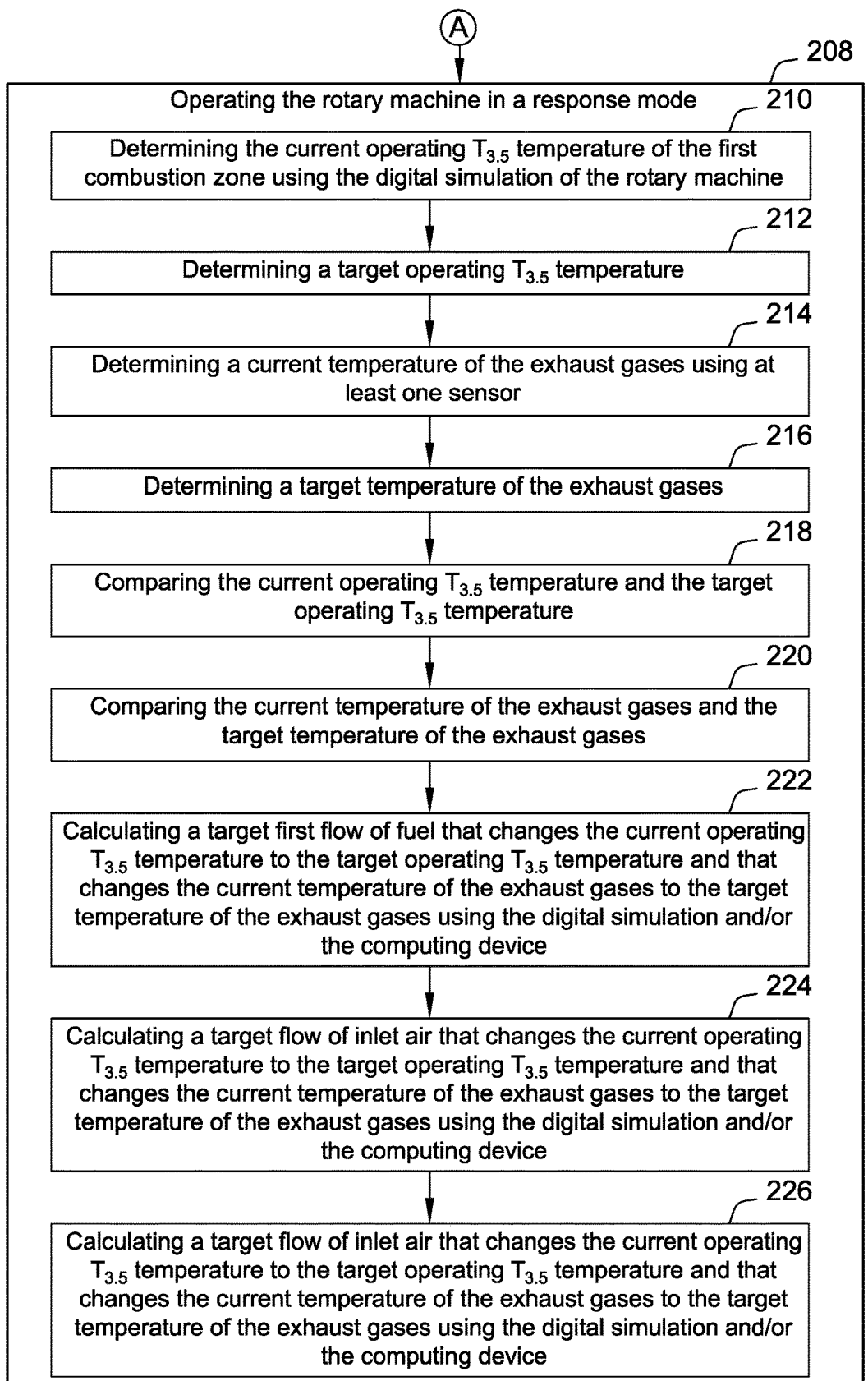
FIG. 2B is a continuation of the flow diagram of FIG. 2A.
Figure 2C:
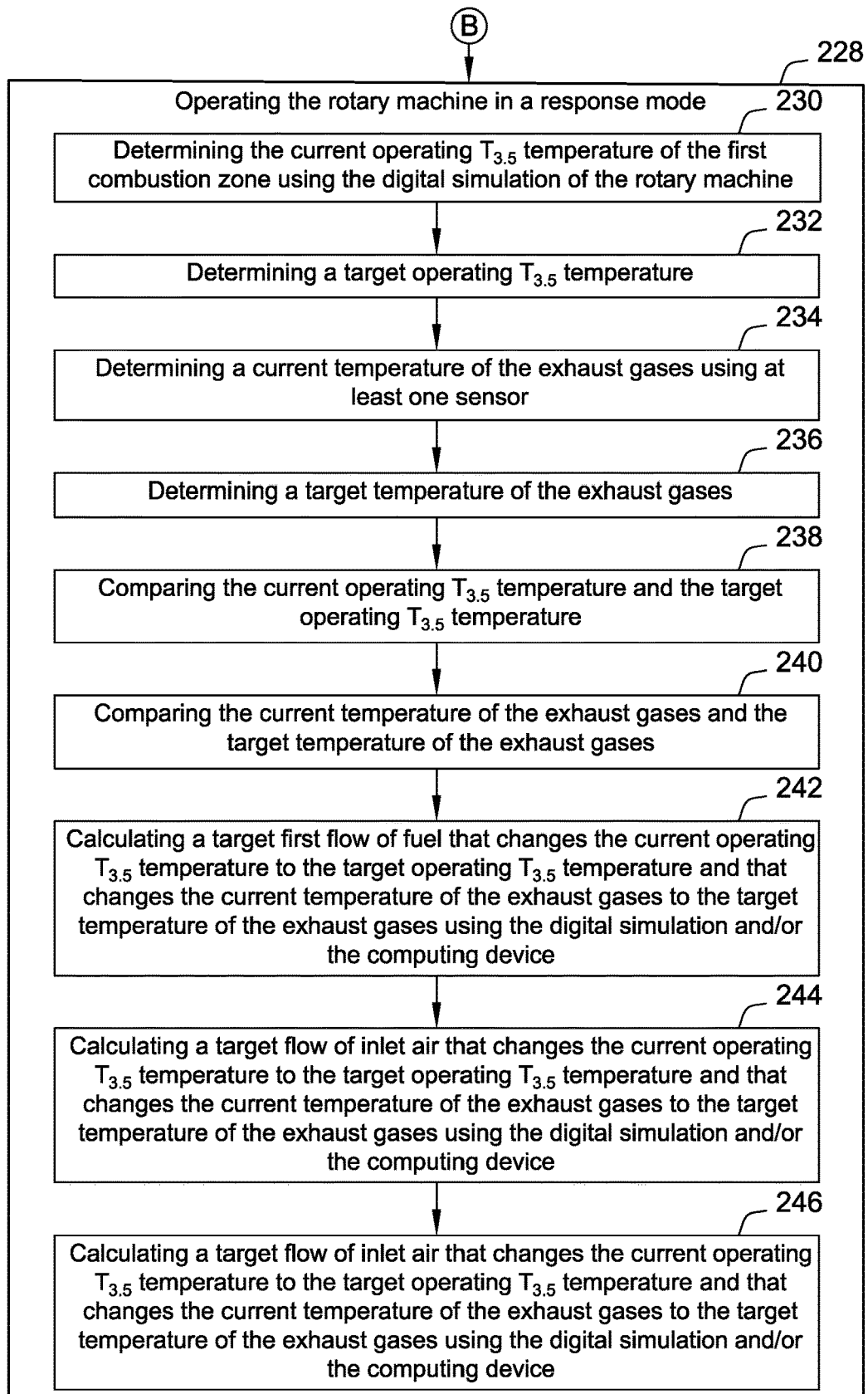
FIG. 2C is a continuation of the flow diagram of FIGS. 2A and 2B.
Figure 2D:
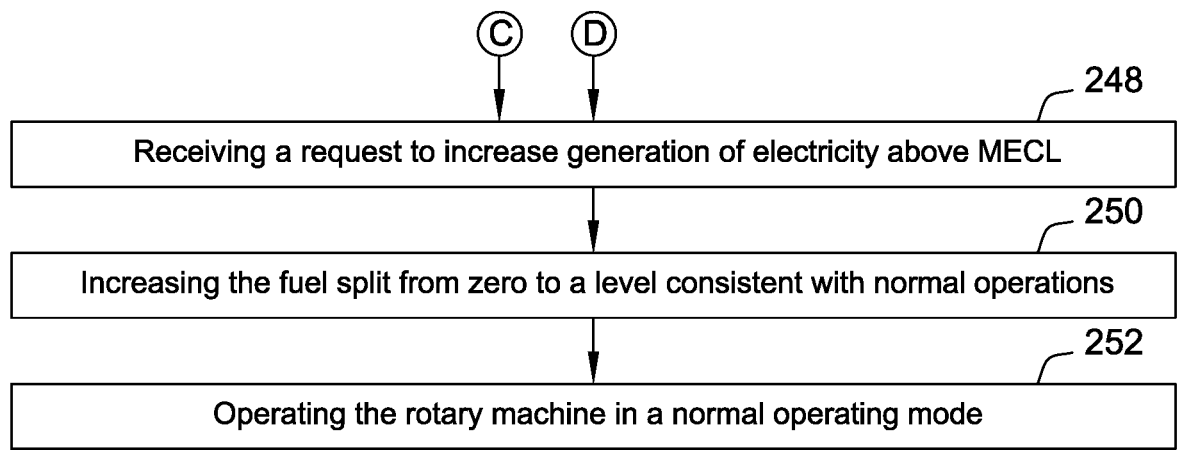
FIG. 2D is a continuation of the flow diagram of FIGS. 2A, 2B, and 2C.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Here and throughout the specification and claims, range limitations may be identified. Such ranges may be combined and/or interchanged and include all the sub-ranges contained therein unless context or language indicates otherwise. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

As used herein, the terms "axial" and "axially" refer to directions and orientations extending substantially parallel to a longitudinal axis of a rotary machine. Moreover, the terms "radial" and "radially" refer to directions and orientations extending substantially perpendicular to the longitudinal axis of the rotary machine. In addition, as used herein, the terms "circumferential" and "circumferentially" refer to directions and orientations extending arcuately about the longitudinal axis of the rotary machine. Further, as used herein, the term "upstream" refers to a forward or inlet end of a rotary machine, and the term "downstream" refers to an aft or exhaust end of the rotary machine. When discussing a flow of fluid through a component, the direction from which the fluid flows is described as "upstream," and the direction in which the fluid flows is described as "downstream."

The methods and systems described herein relate to a method for emissions compliant operation of a combustor of a gas turbine engine below a traditional MECL. More specifically, the gas turbine engine includes a combustor including a first combustion zone, a second combustion zone, at least one first fuel nozzle, and at least one second fuel nozzle. The at least one first fuel nozzle channels a first flow of fuel to the first combustion zone, and the at least one second fuel nozzle channels a second flow of fuel to the second combustion zone. A fuel split is a fraction of a total flow of fuel that is channeled to the second combustion zone. A digital simulation simultaneously determines a current operating temperature of the first combustion zone, and at least one sensor measures a current operating temperature of an exhaust of the combustor. Additionally, inlet guide vanes control a flow of air to the combustor. When the demand on the gas turbine engine is reduced (i.e., when an operator of an electrical grid requests that an operator of the gas turbine engine reduce the generation of electricity), the operator of the gas turbine engine may place the gas turbine engine in response mode and/or standby mode.

In response mode, the operator of the gas turbine engine reduces the fuel split to zero (i.e., turns off the second combustion zone) to reduce the current operating temperature of the combustor for carbon monoxide emissions compliance and controls the flow of air to the combustor with the inlet guide vanes to maintain the exhaust temperature of the gas turbine engine at or above a minimum exhaust temperature, typically the minimum exhaust temperature required for operation of a heat exchanger used to operate an associated steam turbine of the power plant. Response mode allows the gas turbine engine to continue to operate at a reduced, but non-zero, power generation level while maintaining compliance with carbon monoxide emissions requirements.

In standby mode, the operator of the gas turbine engine reduces the fuel split to zero (i.e., turns off the second combustion zone) to reduce the current operating temperature of the combustor for carbon monoxide emissions compliance and controls the flow of air to the combustor with the inlet guide vanes to maintain the exhaust temperature of the combustor below the minimum exhaust temperature for operation of the steam generation system of the power plant. Standby mode allows the gas turbine engine to continue to operate without generating power while maintaining compliance with carbon monoxide emissions requirements.

Both response mode and standby mode allow the gas turbine engine to remain in emissions compliant operation during periods of reduced demand for electricity. As such, when the demand for electricity increases and the operator of the grid requests more electrical generation, the gas turbine engines described herein will still be operational, i.e., will not require an extended start-up procedure, and will be one of the first electrical generators requested to increase generation. In some embodiments, the elimination of a start-up delay in returning such gas turbine engines to increased power production increases revenues for the operator of the gas turbine engine. Accordingly, the systems and methods described herein provide emissions compliant operation of a combustor of a gas turbine engine below the traditional MECL throughout a time period in which the demand for electricity has decreased and the operator of the grid has requested less electrical generation.

FIG. 1 is a schematic view of an exemplary rotary machine 100, i.e., a turbomachine, and more specifically a turbine engine. In the exemplary embodiment, rotary machine 100 is a gas turbine engine. Alternatively, rotary machine may be any other turbine engine and/or rotary machine, including, without limitation, a gas turbofan aircraft engine, other aircraft engine. In the exemplary embodiment, gas turbine engine 100 includes an intake section 102, a compressor section 104 that is coupled downstream from intake section 102, a combustor section 106 that is coupled downstream from compressor section 104, a turbine section 108 that is coupled downstream from combustor section 106, and an exhaust section 110 that is coupled downstream from turbine section 108. Turbine section 108 is coupled to compressor section 104 via a rotor shaft 112.

It should be noted that, as used herein, the term "couple" is not limited to a direct mechanical, thermal, electrical, and/or flow communication connection between components, but may also include an indirect mechanical, thermal, electrical, and/or flow communication connection between multiple components. In the exemplary embodiment, combustor section 106 includes a plurality of combustors 114. Combustor section 106 is coupled to compressor section 104 such that each combustor 114 is in flow communication with the compressor section 104. Rotor shaft 112 is further coupled to a load 116 such as, but not limited to, an electrical generator and/or a mechanical drive application. In the exemplary embodiment, each of compressor section 104 and turbine section 108 includes at least one rotor assembly 118 that is coupled to rotor shaft 112.

In this embodiment, intake section 102 includes at least one inlet guide vane 103 that is controlled by an inlet guide vane controller 105. Inlet guide vanes 103 control a flow of inlet air 120 that intake section 102 channels from the atmosphere to compressor section 104. Specifically, inlet guide vanes 103 may include variable or fixed airfoils 107 that direct inlet air 120 to compressor section 104. Additionally, airfoils 107 of inlet guide vanes 103 may be variable, i.e., an angle of airfoils 107 relative to compressor section 104 may be changed, to vary the angle of flow of inlet air 120 and increase the efficiency of compressor section 104 during different operating conditions.

In the exemplary embodiment, combustors 114 include Axial Fuel Staging (AFS) technology including axial (sequential) staging of combustion in at least two zones. Specifically, one or more of combustors 114 is an axially staged combustor that includes a first combustion zone 115, a second combustion zone 117, at least one first fuel nozzle 119, and at least one second fuel nozzle 121. The at least one first fuel nozzle 119 is positioned upstream of the at least one second fuel nozzle 121 and channels a first flow of fuel into first combustion zone 115, which is correspondingly upstream of second combustion zone 117. The at least one second fuel nozzle 121 is positioned downstream of the at least one first fuel nozzle 119 and first combustion zone 115 and channels a second flow of fuel into second combustion zone 117. First combustion zone 115 and second combustion zone 117 stage the combustion of a total flow of fuel to the combustor to control the combustion dynamics within combustors 114. In the exemplary embodiment, a single first fuel nozzle 119 and a single second fuel nozzle 121 are illustrated in FIG. 1. However, one or more of combustors 114 may include a plurality of first fuel nozzles 119 and/or a plurality of second fuel nozzles 121.

In alternative embodiments, combustor 114 is a single staged combustor including a plurality of combustion zones and a plurality of nozzle arrays that channel fuel to each combustion zone within the single staged combustor. Accordingly, the nozzle arrays stage the flow of fuel to the single stage combustor. In another alternative embodiment, rotary machine 100 includes two turbines, a high pressure turbine (not shown) and a low pressure turbine (not shown). The high pressure turbine is positioned between a first combustor (not shown) and a second combustor (not shown), and the low pressure turbine is positioned downstream of the second combustor. The high pressure turbine recovers energy from combustion gases discharged from the first combustor, and the combustion gases are discharged to the second combustor. The second combustor mixes the combustion gases with fuel and ignites the combustion gases with the fuel. The combustion gases are then discharged from the second combustor to the low pressure turbine, and the low pressure turbine recovers energy from combustion gases discharged from the second combustor. In yet another alternative embodiment, combustor 114 includes more than two combustors and/or combustion zones and more than two nozzle arrays, including three or more combustors and/or combustion zones and three or more nozzle arrays.

Rotary machine 100 also includes a fuel supply system 130 including at least one valve 132 that controls a fuel split of the total flow of fuel. The fuel split corresponds to an apportionment of a total fuel flow to combustor 114 between the first flow of fuel and the second flow of fuel. In the exemplary embodiment, the fuel split is represented as the fraction of the total flow of fuel that is channeled to the at least one second fuel nozzle 121 (i.e., the second flow of fuel divided by the sum of the first and second flow of fuel). Alternatively, the fuel split is represented in any suitable fashion. Specifically, fuel supply system 130 channels the total flow of fuel to combustors 114. More specifically, fuel supply system 130 channels the total flow of fuel to first fuel nozzle 119 and second fuel nozzle 121 which, in turn, channel the total flow of fuel to first combustion zone 115 and second combustion zone 117 respectively. Valve 132 is controllable to split the total flow of fuel into the first flow of fuel and the second flow of fuel according to the selected fuel split.

Rotary machine 100 further includes a computing device 134 that controls at least one operating parameter of rotary machine 100. More specifically, in the exemplary embodiment, computing device 134 controls the fuel split of the total flow of fuel to combustors 114 by controlling valve 132. Additionally, computing device 134 may also send control signals to inlet guide vane controller 105 and/or directly control inlet guide vanes 103 to control flow of inlet air 120 that is channeled to combustors 114. Accordingly, computing device 134 controls the stoichiometry of the combustion reaction within combustors 114 by controlling both the fuel split and flow of inlet air 120 to combustors 114.

Computing device 134 also is programmed to execute a digital simulation of rotary machine 100 that accurately determines at least one temperature within combustor 114, such as a temperature that is not, and/or cannot be, directly measured with reliable accuracy. More specifically, the digital simulation accurately determines the $T_{3.5}$ and the $T_{3.9}$ temperatures within combustor 114, such as in the absence of a direct temperature sensor measurement within first combustion zone 115 and second combustion zone 117. The $T_{3.5}$ temperature is the temperature within combustor 114 that is within first combustion zone 115 and axially upstream of second fuel nozzle 121 and second combustion zone 117. The $T_{3.9}$ temperature is the temperature within combustor 114 within second combustion zone 117 and axially downstream of second fuel nozzle 121. As will be discussed in greater detail below, computing device 134 controls the fuel split and flow of inlet air 120 to combustors 114 to control the $T_{3.5}$ temperature using the digital simulation.

During operation, intake section 102 channels inlet air 120 towards compressor section 104. Computing device 134 and/or inlet guide vane controller 105 control inlet guide vanes 103 to control flow of inlet air 120. Compressor section 104 compresses inlet air 120 to higher pressures prior to discharging compressed air 122 towards combustor section 106. Compressed air 122 is channeled to combustor section 106 where it is mixed with fuel (not shown) and burned to generate high temperature combustion gases 124. Computing device 134 controls the fuel split to first fuel nozzle 119 and second fuel nozzle 121 to control the $T_{3.5}$ temperature within combustors 114 using the digital simulation. Combustion gases 124 are channeled downstream towards turbine section 108 and impinge upon turbine blades (not shown), converting thermal energy to mechanical rotational energy that is used to drive rotor assembly 118 about a longitudinal axis 126. Often, combustor section 106 and turbine section 108 are referred to as a hot gas section of turbine engine 100. Exhaust gases 128 then discharge through exhaust section 110 to ambient atmosphere or to a steam turbine (not shown), if the rotary machine 100 is a gas turbine that is part of a combined cycle power plant.

Figure 3:
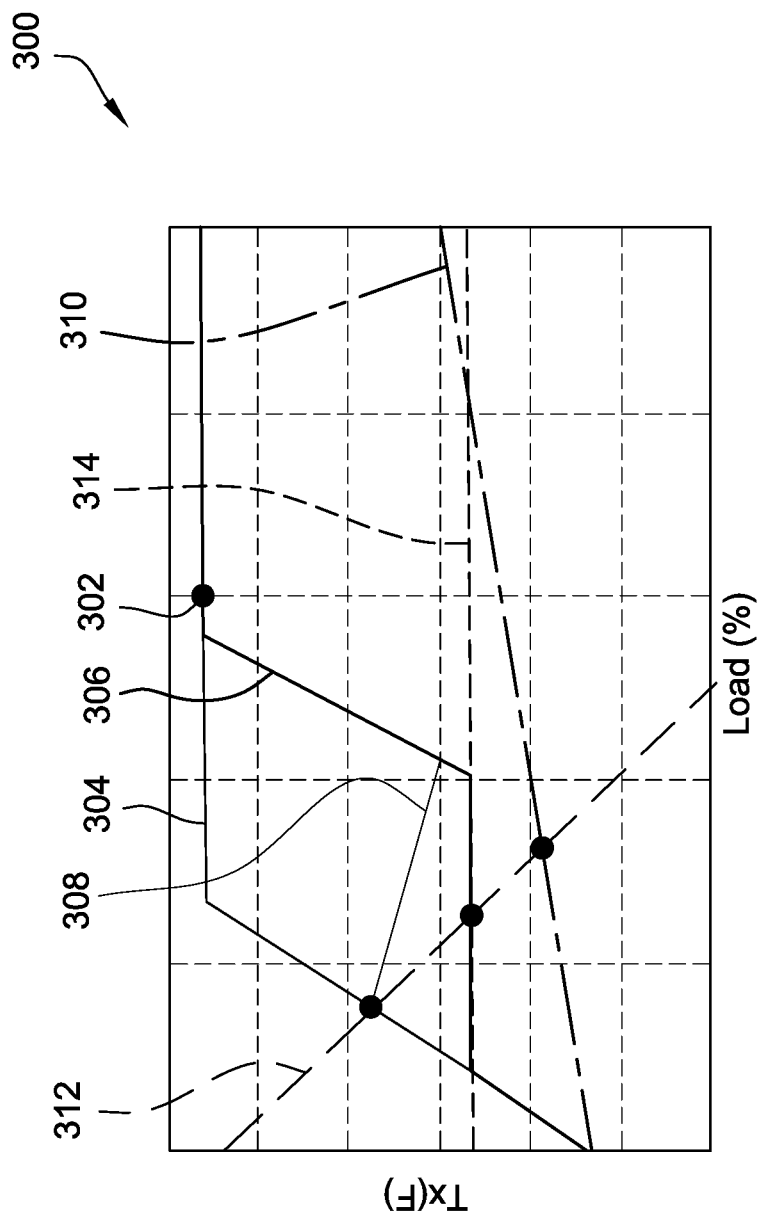
FIG. 3 is a graph of an exemplary relationship between an exhaust temperature and an electrical load of the rotary machine shown in FIG. 1.

FIGS. 2A, 2B, 2C, and 2D are a flow diagram of an exemplary method 200 of emissions compliant operation of rotary machine 100 below a traditional MECL. FIG. 3 is a graph 300 of a relationship between an exhaust temperature of rotary machine 100 and an electrical load of rotary machine 100. Method 200 includes operating 202 rotary machine 100 in a normal operating mode, i.e., at a load above a Minimum Emissions Compliance Load (MECL) 302 and in which power is supplied to the electrical grid. Rotary machine 100 has MECL 302 that is the lowest load on rotary machine 100 in which rotary machine 100 can traditionally normally operate while still in compliance with emissions standards. More specifically, MECL 302 is the lowest load on rotary machine 100 in which the $T_{3.5}$ temperature is maintained at a temperature that maintains compliance with emissions standards, both first combustion zone 115 and second combustion zone 117 are operating, and exhaust gases 128 are maintained at or above a minimum exhaust temperature for operation of the combined cycle power plant.

Graph 300 includes a plurality of lines 304, 306, 308, and 310 that illustrate potential paths of rotary machine 100 during operations. Specifically, graph 300 includes a historic path 304, an example first response mode path 306, an example second response mode path 308, and an example standby mode path 310. Graph 300 also includes a target $T_{3.5}$ temperature line 312 and a target exhaust temperature line 314. Historic path 304 is the path that has historically been followed during start-up, operation, and shut-down of rotary machine 100. First response mode path 306 and second response mode path 308 are examples of a response mode that enables rotary machine 100 to continue to operate at a reduced power generation level while maintaining compliance with carbon monoxide emissions requirements, i.e., to reach an operating point that lies on target $T_{3.5}$ temperature line 312. Specifically, in response mode, the operator of rotary machine 100 reduces the fuel split to zero (i.e., turns off the second combustion zone 117) and controls the flow of air to combustor 114 with inlet guide vanes 103 to reduce the $T_{3.5}$ temperature of first combustion zone 115 and combustor 114, e.g., along one of first response mode path 306 and second response mode path 308 for carbon monoxide emissions compliance, and to maintain exhaust gases 128 at or above target exhaust temperature line 314. i.e., the minimum exhaust temperature for operation of the power plant at a reduced, but non-zero, load. Standby mode path 310 allows rotary machine 100 to continue to operate without generating power while maintaining compliance with carbon monoxide emissions requirements. Specifically, in standby mode, the operator of rotary machine 100 reduces the fuel split to zero (i.e., turns off the second combustion zone) and controls the flow of air to the combustor with inlet guide vanes 103 to reduce the $T_{3.5}$ temperature of first combustion zone 115 and combustor 114 for carbon monoxide emissions compliance, i.e., to reach an operating point that lies on target $T_{3.5}$ temperature line 312, and to maintain exhaust gases 128 below target exhaust temperature line 314, the minimum exhaust temperature for operation of the power plant. Both response mode and standby mode allow rotary machine 100 to remain in emissions compliant operation during periods of reduced demand for electricity. As such, when the demand for electricity increases and the operator of the grid requests more electrical generation, rotary machines 100 described herein will still be operational and will be one of the first electrical generators requested to increase generation, increasing revenues for the operator of rotary machine 100. Accordingly, the systems and methods described herein provide emissions compliant operation of a combustor of rotary machine 100 below MECL 302 when the demand for electricity decreases and the operator of the grid requests less electrical generation.

Method 200 also includes receiving 204 a request to reduce generation of electricity below MECL 302. In the exemplary embodiment, a controller of the electrical grid determines that excess electricity is being generated and requests that one or more generators reduce generation of electrical power. In alternative embodiment, rather than receiving a request to reduce generation of electricity, rotary machine 100 may be required to reduce generation of electricity for other reasons such as, without limitation, emergencies and/or maintenance requirements associated with rotary machine 100, the combined cycle power station, and/or the electrical grid.

Method 200 further includes reducing 206 the fuel split to zero. The operator of rotary machine 100 reduces the fuel split to zero to stop combustion within second combustion zone 117. First fuel nozzle 119 continues to channel the first flow of fuel to into first combustion zone 115 while second fuel nozzle 121 stops channeling the second flow of fuel to into second combustion zone 117. More specifically, computing device 134 controls valve 132 to reduce the second flow of fuel to zero while maintaining the first flow of fuel. As such, first combustion zone 115 is the only combustion zone in operation and the total flow of fuel is not staged to control the combustion dynamics within combustors 114. In an alternative embodiment, the first flow of fuel to into first combustion zone 115 is also reduced to control the $T_{3.5}$ temperature.

Method 200 also includes operating 208 rotary machine 100 in a response mode, such as first response mode 306 and/or second response mode 308. In response mode, the operator of rotary machine 100 reduces the fuel split to zero (i.e., turns off the second combustion zone) and controls the flow of air to combustor 114 with inlet guide vanes 103 to reduce the $T_{3.5}$ temperature of first combustion zone 115 and combustor 114 for carbon monoxide emissions compliance, and to maintain exhaust gases 128 at or above a minimum exhaust temperature for operation of the power plant. Rotary machine 100 then begins to operate along, for example, first response mode path 306 illustrated in graph 300. As shown in graph 300, first response mode path 306 deviates from historic path 304 because second combustion zone 117 is turned off and the combustor temperature is controlled by manipulation of combustor inlet airflow. More specifically, the exhaust temperature and the $T_{3.5}$ temperature are reduced because second combustion zone 117 is turned off and the $T_{3.5}$ temperature is controlled using Inlet Guide Vanes. As such, the load, the exhaust temperature, and $T_{3.5}$ temperature are simultaneously reduced along first response mode path 306 that is different from historic path 304.

Operating 208 rotary machine 100 in the response mode includes determining 210 the current operating $T_{3.5}$ temperature of first combustion zone 115 using the digital simulation of rotary machine 100. The digital simulation is a model of rotary machine 100. Specifically, the digital simulation is any suitable model that accurately determines the operating state of a plurality of operating parameters within rotary machine 100 in real time during operation of rotary machine 100 based on control inputs to computing device 134 and/or feedback from suitable sensors (not shown) positioned throughout rotary machine 100. More specifically, the digital simulation is a thermodynamic and fluid dynamic model that accurately determines the operating state of the plurality of operating parameters within rotary machine 100 in real time during operation of rotary machine 100. The plurality of operating parameters that the digital simulation determines includes, among many other parameters, the $T_{3.5}$ and the $T_{3.9}$ temperatures within combustor 114, which typically cannot be directly measured by sensors within the combustion zones. Accordingly, the digital simulation determines the $T_{3.5}$ and the $T_{3.9}$ temperatures within combustor 114 in real time during operation of rotary machine 100. Determining 210 may occur continuously while other steps of method 200 are occurring simultaneously. In alternative embodiments, determining 210 the current operating $T_{3.5}$ temperature of first combustion zone 115 may include determining 210 the current operating $T_{3.5}$ temperature of first combustion zone 115 using a non-physics based model of rotary machine 100 such as a state variable model or a neural network.

Operating 208 rotary machine 100 in the response mode includes determining 212 a target operating $T_{3.5}$ temperature. In the exemplary embodiment, determining 212 the target operating $T_{3.5}$ temperature includes determining 212 the target operating $T_{3.5}$ temperature using the digital simulation. The digital simulation may determine the target operating $T_{3.5}$ temperature on an iterative basis, simultaneously with determining 210 the actual temperature of first combustion zone 115, using the digital simulation of rotary machine 100. More specifically, the target operating $T_{3.5}$ temperature is determined based on emissions standards to ensure that rotary machine 100 operates in compliance with emissions standards. For example, conditions may change (i.e., the operator of the grid requests that rotary machine 100 increase power generation to a level below MECL 302, the ambient temperature, pressure, and/or humidity may change, and/or the fuel temperature may change) that require updating of the target operating $T_{3.5}$ temperature in order for rotary machine 100 to meet load and emissions requirements. For example, the requirements on load 116 may increase or decrease, and, as such, the operating conditions of rotary machine 100 may change to accommodate the changing requirements on load 116. Specifically, to accommodate the changing requirements on load 116, the target $T_{3.5}$ operating temperature may change. However, in alternative embodiments, the target operating $T_{3.5}$ temperature may be determined by an operator or by some other method, rather than by the digital simulation, and/or may not be updated iteratively with every control cycle. Determining 212 may occur continuously while other steps of method 200 are occurring simultaneously.

Operating 208 rotary machine 100 in the response mode includes determining 214 a current temperature of exhaust gases 128 using at least one sensor (not shown) configured to measure the current operating temperature of exhaust gases 128. The sensor determines the current temperature of exhaust gases 128 in real time during operation of rotary machine 100. Additionally, the temperature of exhaust gases 128 may be sent to the digital simulation and used as an input into determining 210 the current operating $T_{3.5}$ temperature of first combustion zone 115 and/or determining 212 the target operating $T_{3.5}$ temperature. Determining 214 may occur continuously while other steps of method 200 are occurring simultaneously.

Operating 208 rotary machine 100 in the response mode includes determining 216 a target temperature of exhaust gases 128. In the exemplary embodiment, determining 216 the target temperature of exhaust gases 128 includes determining 216 the target operating $T_{3.5}$ temperature using the digital simulation and/or computing device 134. The digital simulation and/or computing device 134 may determine the target temperature of exhaust gases 128 on an iterative basis, simultaneously with determining 214 the current temperature of exhaust gases 128, using the digital simulation and/or computing device 134 of rotary machine 100. More specifically, the target temperature of exhaust gases 128 is determined based on the minimum exhaust temperature for operation of the power plant. For example, conditions may change (i.e., the operator of the grid requests that rotary machine 100 increase power generation to a level below MECL 302) that require updating of the target temperature of exhaust gases 128 in order for rotary machine 100 to meet load requirements. For example, the requirements on load 116 may increase or decrease, and, as such, the operating conditions of rotary machine 100 may change to accommodate the changing requirements on load 116. Specifically, to accommodate the changing requirements on load 116, the temperature of exhaust gases 128 may change. However, in alternative embodiments, the target temperature of exhaust gases 128 may be determined by an operator or by some other method (such as a plant controller separate from a rotary machine controller), rather than by the digital simulation and/or computing device 134, and/or may not be updated iteratively with every control cycle. Determining 216 may occur continuously while other steps of method 200 are occurring simultaneously.

Operating 208 rotary machine 100 in the response mode further includes comparing 218 the current operating $T_{3.5}$ temperature and the target operating $T_{3.5}$ temperature. If the current operating $T_{3.5}$ temperature and the target operating $T_{3.5}$ temperature are different, computing device 134 controls the first flow of fuel and flow of inlet air 120 to change the current operating $T_{3.5}$ temperature to the target operating $T_{3.5}$ temperature as described below. Comparing 218 may occur continuously while other steps of method 200 are occurring simultaneously.

Operating 208 rotary machine 100 in the response mode further includes comparing 220 the current temperature of exhaust gases 128 and the target temperature of exhaust gases 128. If the current temperature of exhaust gases 128 and the target temperature of exhaust gases 128 are different, computing device 134 controls the first flow of fuel and flow of inlet air 120 to change the current temperature of exhaust gases 128 to the target temperature of exhaust gases 128 as described below. Comparing 220 may occur continuously while other steps of method 200 are occurring simultaneously.

Operating 208 rotary machine 100 in the response mode further includes calculating 222 a target first flow of fuel that changes the current operating $T_{3.5}$ temperature to the target operating $T_{3.5}$ temperature and that changes the current temperature of exhaust gases 128 to the target temperature of exhaust gases 128 using the digital simulation and/or computing device 134. In the exemplary embodiment, the digital simulation and/or computing device 134 may calculate the target first flow of fuel that changes the current operating $T_{3.5}$ temperature to the target operating $T_{3.5}$ temperature and that changes the current temperature of exhaust gases 128 to the target temperature of exhaust gases 128 by running an additional digital simulation of rotary machine 100.

Operating 208 rotary machine 100 in the response mode further includes calculating 224 a target flow of inlet air 120 that changes the current operating $T_{3.5}$ temperature to the target operating $T_{3.5}$ temperature and that changes the current temperature of exhaust gases 128 to the target temperature of exhaust gases 128 using the digital simulation and/or computing device 134. In the exemplary embodiment, the digital simulation may calculate the target flow of inlet air 120 that changes the current operating $T_{3.5}$ temperature to the target operating $T_{3.5}$ temperature and that changes the current temperature of exhaust gases 128 to the target temperature of exhaust gases 128 by running an additional digital simulation of rotary machine 100. Alternatively, computing device may calculate the target flow of inlet air 120 that changes the current operating $T_{3.5}$ temperature to the target operating $T_{3.5}$ temperature and that changes the current temperature of exhaust gases 128 to the target temperature of exhaust gases 128.

Operating 208 rotary machine 100 in the response mode further includes controlling 226 the first flow of fuel and flow of inlet air 120 to change the current operating $T_{3.5}$ temperature to the target operating $T_{3.5}$ temperature and the current temperature of exhaust gases 128 to the target temperature of exhaust gases 128. Specifically, computing device 134 controls valve 132 to control the first flow of fuel and inlet guide vanes 103 to control flow of inlet air 120. Computing device 134 controls valve 132 to adjust the first flow of fuel to the target first flow of fuel, and controls control inlet guide vanes 103 to adjust flow of inlet air 120 to the target flow of inlet air 120. Computing device 134 and the digital simulation control flow of inlet air 120 and the first flow of fuel to first combustion zone 115 to control the stoichiometry of first combustion zone 115. After the current operating $T_{3.5}$ temperature has been changed to the target operating $T_{3.5}$ temperature and the current temperature of exhaust gases 128 has been changed to the target temperature of exhaust gases 128, the operating state of rotary machine 100 changes and the digital simulation and/or computing device 134 iterates method 200 as necessary in order to maintain compliance with emissions requirements and maintain the temperature of exhaust gases 128 at or above the minimum exhaust temperature for operation of the power plant.

As shown in graph 300, an example second response mode path 308 extends from first response mode path 306 and may be used, for example, when a temperature of flow of inlet air 120 is relatively high. More specifically, when the temperature of flow of inlet air 120 is above 80° F., for example, second response mode path 308 may be followed by controlling for a target burner tube velocity for first fuel nozzle 119. For example, the target burner tube velocity is the burner tube velocity above which a flame from first fuel nozzle 119 is pushed out into first combustion zone 115 to avoid flashback or auto-ignition.

Method 200 also includes operating 228 rotary machine 100 in a standby mode. In standby mode, the operator of rotary machine 100 reduces the fuel split to zero (i.e., turns off the second combustion zone) and controls the flow of air to combustor 114 with inlet guide vanes 103 to reduce the $T_{3.5}$ temperature of first combustion zone 115 and combustor 114 for carbon monoxide emissions compliance, and to maintain exhaust gases 128 below the minimum exhaust temperature for operation of the power plant, e.g., for operation of a heat exchanger used to generate steam for a steam turbine from the residual heat in exhaust gases 128. The operator operates rotary machine 100 in standby mode rather than response mode because the operator of the grid has requested that the operator reduce generation of electricity below the power generation of response mode. In some embodiments, rotary machine 100 is operating in response mode first, and then in response to a subsequent request from the grid operator for reduced generation, further reduces power generation by operating in standby mode. Rotary machine 100 then begins to operate along, for example, standby mode path 310 illustrated in graph 300. As shown in graph 300, standby mode path 310 deviates from historic path 304 because second combustion zone 117 is turned off and the combustor temperature is controlled by manipulation of combustor inlet airflow. More specifically, the exhaust temperature and the $T_{3.5}$ temperature are reduced because second combustion zone 117 is turned off and the T3.5 temperature is controlled using inlet guide vanes 103. As such, the load, the exhaust temperature, and $T_{3.5}$ temperature are simultaneously reduced along standby mode path 310 that is different from historic path 304.

Operating 228 rotary machine 100 in the standby mode includes determining 230 the current operating $T_{35}$ temperature of first combustion zone 115 using the digital simulation of rotary machine 100 as described in determining 210 above. Determining 230 may occur continuously while other steps of method 200 are occurring simultaneously.

Operating 228 rotary machine 100 in the standby mode includes determining 232 a target operating $T_{35}$ temperature. In the exemplary embodiment, determining 232 the target operating $T_{35}$ temperature includes determining 232 the target operating $T_{35}$ temperature using the digital simulation. The digital simulation may determine the target operating $T_{35}$ temperature on an iterative basis, simultaneously with determining 230 the temperature of first combustion zone 115, using the digital simulation of rotary machine 100. More specifically, the target operating $T_{35}$ temperature is determined based on emissions standards to ensure that rotary machine 100 operates in compliance with emissions standards. For example, conditions may change (i.e., the operator of the grid requests that rotary machine 100 increase power generation to a level below MECL 302) that require updating of the target operating $T_{3.5}$ temperature in order for rotary machine 100 to meet load and emissions requirements. For example, the requirements on load 116 may increase or decrease, and, as such, the operating conditions of rotary machine 100 may change to accommodate the changing requirements on load 116. Specifically, to accommodate the changing requirements on load 116, the target $T_{3.5}$ operating temperature may change. However, in alternative embodiments, the target operating $T_{3.5}$ temperature may be determined by an operator or by some other method, rather than by the digital simulation, and/or may not be updated iteratively with every control cycle. Determining 232 may occur continuously while other steps of method 200 are occurring simultaneously.

Operating 228 rotary machine 100 in the standby mode includes determining 234 a current temperature of exhaust gases 128 using at least one sensor (not shown) configured to measure the current operating temperature of exhaust gases 128. The sensor determines the current temperature of exhaust gases 128 in real time during operation of rotary machine 100. Additionally, the temperature of exhaust gases 128 may be sent to the digital simulation and used as an input into determining 230 the current operating $T_{3.5}$ temperature of first combustion zone 115 and/or determining 232 the target operating $T_{3.5}$ temperature. Determining 234 may occur continuously while other steps of method 200 are occurring simultaneously.

Operating 228 rotary machine 100 in the standby mode includes determining 236 a target temperature of exhaust gases 128. In the exemplary embodiment, determining 236 the target temperature of exhaust gases 128 includes determining 236 the target operating $T_{3.5}$ temperature using the digital simulation and/or computing device 134. The digital simulation and/or computing device 134 may determine the target temperature of exhaust gases 128 on an iterative basis, simultaneously with determining 234 the current temperature of exhaust gases 128, using the digital simulation and/or computing device 134 of rotary machine 100. More specifically, the target temperature of exhaust gases 128 is determined based on the physical operating limits of rotary machine 100 and the best heat rate. Determining 236 may occur continuously while other steps of method 200 are occurring simultaneously.

Operating 228 rotary machine 100 in the standby mode further includes comparing 238 the current operating $T_{3.5}$ temperature and the target operating $T_{3.5}$ temperature. If the current operating $T_{3.5}$ temperature and the target operating $T_{3.5}$ temperature are different, computing device 134 controls the first flow of fuel and flow of inlet air 120 to change the current operating $T_{3.5}$ temperature to the target operating $T_{3.5}$ temperature as described below. Comparing 238 may occur continuously while other steps of method 200 are occurring simultaneously.

Operating 228 rotary machine 100 in the standby mode further includes comparing 240 the current temperature of exhaust gases 128 and the target temperature of exhaust gases 128. If the current temperature of exhaust gases 128 and the target temperature of exhaust gases 128 are different, computing device 134 controls the first flow of fuel and flow of inlet air 120 to change the current temperature of exhaust gases 128 to the target temperature of exhaust gases 128 as described below. Comparing 240 may occur continuously while other steps of method 200 are occurring simultaneously.

Operating 228 rotary machine 100 in the standby mode further includes calculating 242 a target first flow of fuel that changes the current operating $T_{3.5}$ temperature to the target operating $T_{3.5}$ temperature and that changes the current temperature of exhaust gases 128 to the target temperature of exhaust gases 128 using the digital simulation and/or computing device 134. In the exemplary embodiment, the digital simulation may calculate the target first flow of fuel that changes the current operating $T_{3.5}$ temperature to the target operating $T_{3.5}$ temperature and that changes the current temperature of exhaust gases 128 to the target temperature of exhaust gases 128 by running an additional digital simulation of rotary machine 100. Alternatively, computing device may calculate the target first flow of fuel that changes the current operating $T_{3.5}$ temperature to the target operating $T_{3.5}$ temperature and that changes the current temperature of exhaust gases 128 to the target temperature of exhaust gases 128.

Operating 228 rotary machine 100 in the standby mode further includes calculating 244 a target flow of inlet air 120 that changes the current operating $T_{3.5}$ temperature to the target operating $T_{3.5}$ temperature and that changes the current temperature of exhaust gases 128 to the target temperature of exhaust gases 128 using the digital simulation and/or computing device 134. In the exemplary embodiment, the digital simulation may calculate the target flow of inlet air 120 that changes the current operating $T_{3.5}$ temperature to the target operating $T_{3.5}$ temperature and that changes the current temperature of exhaust gases 128 to the target temperature of exhaust gases 128 by running an additional digital simulation of rotary machine 100. Alternatively, computing device may calculate the target flow of inlet air 120 that changes the current operating $T_{3.5}$ temperature to the target operating $T_{3.5}$ temperature and that changes the current temperature of exhaust gases 128 to the target temperature of exhaust gases 128.

Operating 228 rotary machine 100 in the standby mode further includes controlling 246 the first flow of fuel and flow of inlet air 120 to change the current operating $T_{3.5}$ temperature to the target operating $T_{3.5}$ temperature and the current temperature of exhaust gases 128 to the target temperature of exhaust gases 128. Specifically, computing device 134 controls valve 132 to control the first flow of fuel and inlet guide vanes 103 to control flow of inlet air 120. Computing device 134 controls valve 132 to adjust the first flow of fuel to the target first flow of fuel, and controls control inlet guide vanes 103 to adjust flow of inlet air 120 to the target flow of inlet air 120. Computing device 134 and digital simulation control flow of inlet air 120 and the first flow of fuel to first combustion zone 115 to control the stoichiometry of first combustion zone 115. After the current operating $T_{3.5}$ temperature has been changed to the target operating $T_{3.5}$ temperature and the current temperature of exhaust gases 128 has been changed to the target temperature of exhaust gases 128, the operating state of rotary machine 100 changes and the digital simulation and/or computing device 134 iterates method 200 as necessary in order to maintain compliance with emissions requirements and maintain the temperature of exhaust gases 128 below the minimum exhaust temperature for operation of the power plant.

Method 200 also includes receiving 248, while operating in the response mode or the standby mode, a request to increase generation of electricity above MECL 302. In the exemplary embodiment, a controller of the electrical grid determines that too little electricity is being generated and requests that one or more generators increase generation of electrical power. In alternative embodiment, rather than receiving a request to increase generation of electricity, rotary machine 100 may be required to increase generation of electricity for other reasons such as, without limitation, emergencies and/or maintenance requirements associated with rotary machine 100, the combined cycle power station, and/or the electrical grid.

Method 200 further includes increasing 250 the fuel split from zero to a level consistent with normal operations. The operator of rotary machine 100 increases the fuel split and reignites combustion within second combustion zone 117. First fuel nozzle 119 and second fuel nozzle 121 channel the first and second flows of fuel into first combustion zone 115 and second combustion zone 117, respectively. More specifically, computing device 134 controls valve 132 to increase the second flow of fuel while maintaining the first flow of fuel. As such, first combustion zone 115 and second combustion zone 117 are both operating and the total flow of fuel is staged to control the combustion dynamics within combustors 114. In an alternative embodiment, the first flow of fuel into first combustion zone 115 is also increased to control the $T_{3.5}$ temperature.

Method 200 also includes operating 252 rotary machine 100 in a normal operating mode, such as in response to the request to increase generation of electricity. In the normal operating mode, the operator of rotary machine 100 increases the fuel split to maintain the $T_{3.5}$ temperature in compliance with emissions requirements and controls the flow of air to combustor 114 with inlet guide vanes 103 to maintain exhaust gases 128 at or above a minimum exhaust temperature for operation of the power plant. Rotary machine 100 then begins to operate along historic path 304 illustrated in graph 300.

Method 200 maybe implemented with rotary machines 100 with alternative combustor 114 arrangements. For example, method 200 may be implemented with combustors 114 including a single staged combustor including a plurality of nozzle arrays as described above. Additionally, method 200 may be implemented with rotary machine 100 including a high pressure turbine positioned between a first combustor and a second combustor, and a low pressure turbine positioned downstream of the second combustor as described above. Moreover, method 200 may be implemented with any combustor 114 arrangement that enables rotary machine 100 operate as described herein.

The above described systems and methods relate to a method for emissions compliant operation of a combustor of a gas turbine engine below a traditional MECL. More specifically, the gas turbine engine includes a combustor including a first combustion zone, a second combustion zone, at least one first fuel nozzle, and at least one second fuel nozzle. The at least one first fuel nozzle channels a first flow of fuel to the first combustion zone, and the at least one second fuel nozzle channels a second flow of fuel to the second combustion zone. A fuel split is a fraction of a total flow of fuel that is channeled to the second combustion zone. A digital simulation simultaneously determines a current operating temperature of the first combustion zone, and at least one sensor measures a current operating temperature of an exhaust of the gas turbine. Additionally, inlet guide vanes control a flow of air to the combustor. When the demand on the gas turbine engine is reduced (i.e., when an operator of an electrical grid requests that an operator of the gas turbine engine reduce the generation of electricity), the operator of the gas turbine engine may place the gas turbine engine in response mode and/or standby mode.

In response mode, the operator of the gas turbine engine reduces the fuel split to zero (i.e., turns off the second combustion zone) and controls the flow of air to the combustor with the inlet guide vanes to reduce the current operating temperature of the combustor for carbon monoxide emissions compliance and to maintain the exhaust temperature of the combustor at or above a minimum exhaust temperature for operation of a steam generation system of the power plant. Response mode allows the gas turbine engine to continue to operate at a reduced power generation level by the combined cycle power plant, while maintaining compliance with carbon monoxide emissions requirements.

In standby mode, the operator of the gas turbine engine reduces the fuel split to zero (i.e., turns off the second combustion zone) and controls the flow of air to the combustor with the inlet guide vanes to reduce the current operating temperature of the combustor for carbon monoxide emissions compliance, and to maintain the exhaust temperature of the combustor below the minimum exhaust temperature for operation of the steam generation system of the power plant. Standby mode allows the gas turbine engine to continue to operate without the combined cycle power plant generating power, while maintaining compliance with carbon monoxide emissions requirements.

Both response mode and standby mode allow the gas turbine engine to remain in emissions compliant operation during periods of reduced demand for electricity. As such, when the demand for electricity increases and the operator of the grid requests more electrical generation, the gas turbine engines described herein will still be operational and will be one of the first electrical generators requested to increase generation, increasing revenues for the operator of the gas turbine engine. Accordingly, the systems and methods described herein provide emissions compliant operation of a combustor of a gas turbine engine below the traditional MECL when the demand for electricity decreases and the operator of the grid requests less electrical generation.

Additionally, an exemplary technical effect of the systems and methods described herein includes at least one of: (a) controlling a temperature of a first combustion zone of a combustor; (b) controlling an electrical load generated by a gas turbine engine; and (c) controlling a flow of air to a compressor and a combustor.

Exemplary embodiments of systems and methods for emissions compliant operation of a combustor of a gas turbine engine below a traditional MECL are described above in detail. The methods and systems are not limited to the specific embodiments described herein, but rather, components of systems and/or steps of the methods may be utilized independently and separately from other components and/or steps described herein. For example, the method may also be used in combination with other rotary machines, and are not limited to practice only with the gas turbine engines as described herein. Rather, the exemplary embodiment can be implemented and utilized in connection with many other rotary machine applications.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of operating a rotary machine below a minimum emissions compliance load in a response mode, the rotary machine including a combustor including a first combustion zone and a second combustion zone, said method comprising:

i) reducing a fuel split to zero, wherein the fuel split apportions a total flow of fuel to the combustor between the first combustion zone and the second combustion zone;
ii) determining a current operating temperature of the first combustion zone using a digital simulation of the rotary machine;
iii) determining a target operating temperature of the first combustion zone, wherein the target operating temperature enables the rotary machine to operate below a traditional Minimum Emissions Compliance Load (MECL) while still in compliance with emissions standards;
iv) channeling a first flow of fuel to the first combustion zone, wherein the first flow of fuel decreases the temperature of the first combustion zone to the target operating temperature; and
v) iterating steps i through iv until the rotary machine is operating below the traditional MECL and complying with emission standards.

2. The method of claim 1 further comprising determining a current temperature of exhaust gases from the rotary machine.

3. The method of claim 2 further comprising determining a target temperature of the exhaust gases at or above a minimum exhaust temperature for operation of a power plant.

4. The method of claim 3 further comprising comparing the current temperature of the exhaust gases and the target temperature of the exhaust gases.

5. The method of claim 4 further comprising calculating a target flow of inlet air that decreases the temperature of the first combustion zone to the target operating temperature and that decreases the current temperature of the exhaust gases to the target temperature of the exhaust gases.

6. The method of claim 5 further comprising channeling a flow of air to the first combustion zone, wherein the flow of air decreases the temperature of the exhaust gases from the current temperature to the target temperature.

7. A method of operating a rotary machine below a minimum emissions compliance load in a standby mode, the rotary machine including a combustor including a first combustion zone and a second combustion zone, said method comprising:
i) reducing a fuel split to zero, wherein the fuel split apportions a total flow of fuel to the combustor between the first combustion zone and the second combustion zone;
ii) determining a current operating temperature of the first combustion zone using a digital simulation of the rotary machine;
iii) determining a target operating temperature of the first combustion zone, wherein the target operating temperature enables the rotary machine to operate below a traditional Minimum Emissions Compliance Load (MECL) while still in compliance with emissions standards;
iv) channeling a first flow of fuel to the first combustion zone, wherein the first flow of fuel decreases the temperature of the first combustion zone to the target operating temperature and decreases a temperature of exhaust gases from the rotary machine below a minimum exhaust temperature for operation of a power plant; and
v) iterating steps i through iv until the rotary machine is operating below the traditional MECL and complying with emission standards.

8. The method of claim 7 further comprising determining a current temperature of the exhaust gases from the rotary machine.

9. The method of claim 8 further comprising determining a target temperature of the exhaust gases below the minimum exhaust temperature for operation of a power plant.

10. The method of claim 9 further comprising comparing the current temperature of the exhaust gases and the target temperature of the exhaust gases.

11. The method of claim 10 further comprising calculating a target flow of inlet air that decreases the temperature of the first combustion zone to the target operating temperature and that decreases the current temperature of the exhaust gases to the target temperature of the exhaust gases.

12. The method of claim 11 further comprising channeling a flow of air to the first combustion zone, wherein the flow of air decreases the temperature of the exhaust gases from the current temperature to the target temperature.

13. A rotary machine comprising:
a compressor configured to compress a flow of inlet air;
a combustor comprising a first combustion zone, a second combustion zone, at least one first fuel nozzle, and at least one second fuel nozzle, wherein said at least one first fuel nozzle is configured to channel a first flow of fuel to said first combustion zone, and said at least one second fuel nozzle is configured to channel a second flow of fuel to said second combustion zone, and wherein said combustor is configured to receive the flow of inlet air, and wherein a fuel split is a fraction of a total flow of fuel that is channeled to said second combustion zone; and
a computing device comprising a digital simulation of said rotary machine, said computing device is configured to operate said rotary machine in a response mode, wherein said computing device is configured to:
reducing a fuel split to zero;
determining a current operating temperature of said first combustion zone using the digital simulation of said rotary machine;
determining a target operating temperature of said first combustion zone, wherein the target operating temperature enables said rotary machine to operate below a traditional Minimum Emissions Compliance Load (MECL) while still in compliance with emissions standards;
channeling a first flow of fuel to said first combustion zone, wherein the first flow of fuel decreases the temperature of said first combustion zone to the target operating temperature; and
iterating until said rotary machine is operating below the traditional MECL and complying with emission standards.

14. The rotary machine of claim 13 further comprising a fuel supply system configured to channel the total flow of fuel to said first combustion zone and said second combustion zone.

15. The rotary machine of claim 14, wherein said fuel supply system comprises at least one valve configured to split the total flow of fuel into the first flow of fuel and the second flow of fuel.

16. The rotary machine of claim 13 further comprising a plurality of inlet guide vanes configured to control the flow of inlet air into the combustor.

17. The rotary machine of claim 16 wherein said computing device is configured to control said inlet guide vanes.

18. The rotary machine of claim 13 further comprising determining a target temperature of exhaust gases from said rotary machine at or above a minimum exhaust temperature for operation of a power plant.

19. The rotary machine of claim 18 further comprising calculating a target flow of inlet air that decreases the temperature of said first combustion zone to the target operating temperature and that decreases a current temperature of the exhaust gases to the target temperature of the exhaust gases.

20. The rotary machine of claim 13, wherein said combustor comprises a plurality of combustors each including one or more combustion zones.

\* \* \* \* \*